UNITED STATES PATENT OFFICE.

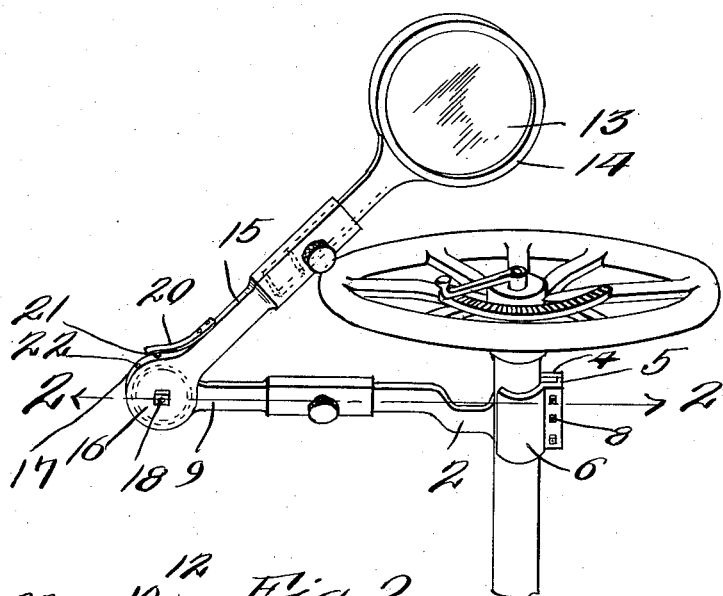

HARRY L. BEST, SR., OF DAVIS, WEST VIRGINIA.

SIGHTING-SHADE.

1,154,838. Specification of Letters Patent. Patented Sept. 28, 1915.

Application filed March 11, 1915. Serial No. 13,709.

*To all whom it may concern:*

Be it known that I, HARRY L. BEST, Sr., a citizen of the United States, residing at Davis, in the county of Tucker and State of West Virginia, have invented a new and useful Sighting-Shade; and I do hereby declare the following to be a full, clear, and exact description of the invention, such as will enable others skilled in the art to which it appertains to make and use the same.

This invention relates to a new and useful sighting shade adapted more especially for use upon automobiles and the like, for shading and protecting the chauffeur's eyes.

An object of the invention is the provision of a suitable bracket arm adjustably mounted upon a stationary part of the automobile, particularly the steering column, and to one end of which bracket arm an extension of the shade holder is adjustably connected, whereby the shade holder may be adjusted in different positions.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in perspective showing the improved sighting shade as applied to the steering column of an automobile. Fig. 2 is a sectional view on line 2—2 of Fig. 1. Fig. 3 illustrates collective views of the adjustably connected adjacent ends of the bracket arm and the extension of the sighting shade holder.

Referring more especially to the drawings, 1 designates a bracket arm having an offset portion 2 at one end, which terminates in a semi-circular clamp 3, there being an extension 4, to which is clamped an angular extension 5 of a coöperating clamping member 6, by means of a bolt and nut 7 and 8, which clamping member 6 is also semi-circular, so as to receive the steering column between it and the clamping member 3. The other end of the bracket arm 9 is provided with a disk 10 having a peripheral flange 11, which is provided with a plurality of transverse notches 12. The sighting shade 13 (which may be any suitable transparent colored member) is held in an annular band 14, and projecting from this band is an extension or arm 15. One end of the extension or arm 15 is provided with a disk 16 having a peripheral flange 17, which overlies the flange 11, there being a suitable pivot bolt 18 to hold the two disks pivotally clamped together. Secured at 19 to the extension or arm 15 is a spring pawl 20, the free spring end of which is provided with a laterally extending lug 21, extending through an aperture 22 in the flange 17 of the disk 16, so as to engage any one of the transverse notches 12 of the flange 11, so as to hold the extension or arm 15 and the holder in different adjusted positions, as may be required by the chauffeur.

The invention having been set forth, what is claimed as new and useful is:—

In combination with a sighting eye shade having an extension provided at one end with a flanged disk, the flange of which is provided with an aperture, a bracket arm having adjustable connections to a steering column, one end of the bracket arm being provided with a disk formed with an annular flange engaging within the flange of the disk of the extension, the flange of the disk of the bracket arm having transverse notches in its periphery, means for pivoting the disks together, and a spring device secured to the extension and provided with a lug extending through the aperture of the flange of the disk of the extension arm and designed to engage the notches of the flange of the disk of the bracket arm to hold the extension and the shade in adjusted positions.

In testimony whereof I have signed my name to this specification in the presence of two subscribing witnesses.

HARRY L. BEST, SR.

Witnesses:
W. E. PATTERSON,
H. A. MEYER.